United States Patent
Iijima et al.

(10) Patent No.: US 7,201,793 B2
(45) Date of Patent: Apr. 10, 2007

(54) INK-JET INK AND INK-JET RECORDING METHOD

(75) Inventors: Hirotaka Iijima, Hachioji (JP); Yasuhiko Kawashima, Iruma (JP); Kenichi Ohkubo, Hachioji (JP); Teruyuki Fukuda, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 65 days.

(21) Appl. No.: 11/047,967

(22) Filed: Jan. 31, 2005

(65) Prior Publication Data

US 2005/0172854 A1 Aug. 11, 2005

(30) Foreign Application Priority Data

Feb. 9, 2004 (JP) .............................. 2004-031739

(51) Int. Cl.
*C09D 11/02* (2006.01)
*G01D 11/00* (2006.01)

(52) U.S. Cl. .............................. 106/31.58; 106/31.86; 347/100

(58) Field of Classification Search ............. 106/31.58, 106/31.86; 347/100
See application file for complete search history.

(56) References Cited

U.S. PATENT DOCUMENTS

| | | | | |
|---|---|---|---|---|
| 5,010,125 A | * | 4/1991 | Kruse et al. ................. | 524/308 |
| 5,104,448 A | * | 4/1992 | Kruse ........................ | 106/31.58 |
| 5,663,217 A | * | 9/1997 | Kruse ......................... | 523/161 |
| 5,837,046 A | * | 11/1998 | Schofield et al. ........ | 106/31.86 |
| 6,013,124 A | * | 1/2000 | Saibara et al. ............ | 106/31.86 |
| 6,231,654 B1 | * | 5/2001 | Elwakil .................... | 106/31.47 |
| 2005/0039634 A1 | * | 2/2005 | Hermansky ............. | 106/31.59 |

FOREIGN PATENT DOCUMENTS

| | | |
|---|---|---|
| JP | 09-176538 A | 7/1987 |
| JP | 10-272828 A | 10/1998 |
| JP | 10-316915 A | 12/1998 |
| JP | 11-172174 A | 6/1999 |
| JP | 2000-095983 A | 4/2000 |
| JP | 2000-239591 A | 9/2000 |

* cited by examiner

*Primary Examiner*—J. A. Lorengo
*Assistant Examiner*—Veronica Faison-Gee
(74) *Attorney, Agent, or Firm*—Frishauf, Holtz, Goodman & Chick, P.C.

(57) ABSTRACT

An ink for ink-jet recording containing: a colorant; and a set of solvent A and solvent B, provided that solvent B has a larger vapor pressure than solvent A, wherein the set of solvent A and solvent B has a maximum in viscosity by changing a mixing ratio of solvent A to solvent B; and a content of solvent A in weight ($A_{(wt)}$) and a content of solvent B in weight ($B_{(wt)}$) in the ink satisfy the following relationship: $50 \leq [A_{(wt)}/(A_{(wt)}+B_{(wt)})] \times 100 \leq 95$.

7 Claims, 1 Drawing Sheet

INK-JET INK AND INK-JET RECORDING METHOD

FIELD OF THE INVENTION

The present invention relates to a novel ink-jet ink and an ink-jet recording method using the same.

BACKGROUND OF THE INVENTION

In ink-jet recording, recording of images and text is performed by ejecting minute ink droplets based on various action principles to be deposited on recording materials such as paper. Ink-jet recording exhibits advantages such as relatively high speed, low noise, and easy realization of multicolor formation.

In recent years, since ink-jet recording enables simple and less expensive formation of images, it has been applied to various printing fields such as photography, various kinds of printing, marking, and special printing such as color filters. Specifically, by employing ink-jet recording apparatuses which eject minute ink droplets and control them, ink-jet inks which result in an improved range of color reproduction, durability, as well as ejection adaptability, and specialized paper sheets of which ink absorbability, color forming properties of colorants and surface glossiness are markedly improved, it has become possible to result in image quality comparable to conventional silver salt photography. Improvement in image quality of the current ink-jet recording systems have only been achieved by integration of ink-jet recording apparatuses, ink-jet inks, and recording materials.

In ink-jet printers employed for ink-jet recording, since recording is performed by depositing ink droplets from ink-jet heads on recording materials, the printers exhibit advantages such as easer downsizing of the recording device, capability of recording highly detailed images at a relatively high rate, lower running cost, and the ease of recording of color images.

Of late, in view of highly detailed image recording, the nozzle orifice size of ink-jet heads has decreased. However, when the nozzle orifice size decreases, ink clogging and decap at the nozzle section tend to occur. "Decap" indicates a phenomenon of clogging at the nozzles caused by evaporation of a solvent (such as water) contained in the ink. In order to minimize these problems, maintenance such as suction and wiping of the nozzle section is more frequently performed, resulting in necessity of longer maintenance time in addition to image printing time. Specifically, at present, since higher printing rates are demanded, an increase in time required for the above maintenance due to the decreased nozzle orifice size has become a major problem.

On the other hand, ink-jet printers are known which employ a serial printing system in which scanning is performed in such a manner that the ink-jet head moves in the direction which crosses the conveyances direction of recording materials and a line printing system in which the ink-jet head is fixed perpendicular to the conveyance direction of recording materials.

In ink-jet printers employing the above line printing system, fixed type parallel recording heads are employed which are arranged at a right angle to the conveying direction of recording materials, and in that system, recording is performed employing only secondary scanning while recording materials are conveyed in the conveying direction. While ink is ejected from the ink-jet heads and over-all one-line recording is continuously performed, paper is conveyed at a specified rate, whereby images are formed on the entire area of the recording material. This method makes it possible to easily achieve a high rate of printing. On the other hand, however, since ink heads are fixed, resulting in mechanism making it difficult to perform maintenance. As a result, as noted above, demand is increasing to reduce maintenance time, due to ink clogging and decap in the nozzle section as, short as possible.

On the contrary, in ink-jet printers employing the serial printing system (hereinafter occasionally referred to as the shuttle head system), while intermittently conveying the recording material, images are formed by moving ink-jet heads in the direction which crosses at right angles to the conveying direction of recording materials. In these serial system ink-jet printers, it is easy to perform maintenance, but has been difficult to consistently prepare highly detailed images. Further, since ink-jet heads are mechanically driven back and forth, there are drawbacks for enhancement of the printing rate.

Proposed as a method to minimize clogging due to ink and decap, which hinder an increase in printing rate and formation of highly detailed images is, for example, one in which formation of a network and aggregates in ink is minimized by incorporating anion oxides as a surface active agent in the ink (refer, for example, to Patent Document 1). However, employed as ink solvents, proposed in the above method, are those composed of water exhibiting a high vapor pressure as a main component. Subsequently, problems are inherent in which capability capable of minimizing decap is limited due to an increase in viscosity of ink liquid caused by water evaporation.

Further proposed is a method (refer, for example, to Patent Document 2), which selects ink constituting materials in such a manner that water, water-soluble organic solvents, and water-soluble dyes are employed so that even though components such as water, which have a relatively high vapor pressure, are evaporated, the resultant ink is not solidified and the variation ratio of viscosity of the ink liquid is within a factor of ten, compared to the initial viscosity. However, in this method, it becomes necessary to select dyes which are highly soluble in solvents which did not evaporate. As a result, diffusion of dyes after being printed on recording materials increases, resulting in bleeding.

Further, disclosed is ink in which specified latex polymers, 3-hexyl-2,5-diol, and 1,2-octane-diol are simultaneously used (refer, for example, to Patent Document 3). However, in this method, since an excessive added amount of 2-octanediol results in feathering, its amount is limited with in the range of 0.01–0.5 percent by weight. Due to that, currently, decap is not minimized as desired. Further, in this method, water at a relatively high vapor pressure is employed as a major solvent. As a result, problems are inherent in which decap minimizing effects are limited due to an increase in viscosity caused by water evaporation.

As noted above, currently, a method has not been discovered which simultaneously achieves formation of highly detailed images, high rate printing, and minimization of decap.

On the other hand, in ink-jet image recording systems which necessitate specialized paper sheets, problems occur in which recording materials are limited and the cost of recording materials increases. Specifically in offices, a system is increasingly demanded which is capable of performing full-color printing at a high rate without any limitation to recording materials (e.g., plain paper, coated paper, art paper, or double sided printing on plain paper).

Various studies have been conducted with regard to compositions of ink-jet inks capable of achieving higher speed printing, desired text reproduction on plain paper, resulting in no ink penetration to the back surface during printing (being the phenomena in which printed ink passes through the recording material and a printed image appears on the rear surface), no feathering, and no image bleeding, as well as resulting in quick penetration into the recording paper and rapid drying of the image.

As one of these methods, so-called water-based ink-jet inks are widely employed. When images are recorded on plain paper such as copy paper for electrophotography, high quality paper or medium quality paper, in addition to problems such as image penetration to the rear surface and feathering due to penetration, curling and cockling of images recorded on plain paper result in major problems.

In order to overcome the above drawbacks, an ink-jet recording method is disclosed (refer, for example, to Patent Document 4) which employs a penetration-improved ink by specifying the wetting time and the absorption coefficient of recording materials in the Bristow method. However, since colorants in the ink simultaneously penetrate into plain paper, this method results in problems, in which a decrease in image density as well as penetration to the rear surface is enhanced, resulting in unsuitability for both sided printing.

Further, ink-jet ink is disclosed (refer, for example, to Patent Document 5) which incorporates specified amide compounds, pyridine derivatives, imidazoline compounds or urea compounds as an anticurl agent. However, this method results in problems in which clogging of the nozzle of a recording head tend to occur due to drying of liquid ink.

Still further, proposed is an ink-jet recording method to minimize the above curling (refer, for example, to Patent Document 6), in which curling balance is optimized by providing a solution containing water on the side opposite the image printing surface. However, this method results in problems in which along with an increase in the adhered amount of ink as well as curl balance liquid onto plain paper, its strength is deteriorated, whereby jamming tends to occur during conveyance.

Still further, instead of using the water-based ink-jet ink, a solvent-based ink capable of achieving printing at a high rate has been studied. Namely, by employing an oil-based ink (being a solvent-based ink-jet ink), even though printed on plain paper, it is possible to achieve high speed printing due to quick penetration into recording materials, shorter drying time, and no curling of recording materials. However, problems occur in which text is not reproduced as desired and penetration to the rear surface results due to the fact that the solvent based ink easily penetrates plain paper.

(Patent Document 1) Japanese Patent Publication Open to Public Inspection (hereinafter referred to as JP-A) No. 11-172174
(Patent Document 2) JP-A No. 2000-95983
(Patent Document 3) JP-A No. 2000-239591
(Patent Document 4) JP-A No. 10-316915
(Patent Document 5) JP-A No. 9-176538
(Patent Document 6) JP-A No. 10-272828

SUMMARY OF THE INVENTION

In view of the foregoing problems, the present invention was achieved. An object of the present invention is to provide an ink which exhibits excellent ejection stability in an ink-jet printer, excellent decap durability, excellent text quality of formed images, reduced rear surface penetration, and reduced curling characteristic of printed recording materials, and an ink-jet recording method using the same.

The aforesaid object of the present invention is achieved employing an ink for ink-jet recording containing: a colorant; and a set of solvent A and solvent B, provided that solvent B has a larger vapor pressure than solvent A, wherein the set of solvent A and solvent B has a maximum in viscosity by changing a mixing ratio of solvent A to solvent B; and a weight of solvent $A(A_{(wt)})$ and a weight of solvent $B(B_{(wt)})$ in the ink satisfy the predetermined relationship which will be detailed below.

According to the present invention, it is possible to provide an ink-jet ink which exhibits excellent ejection stability in an ink-jet printer, excellent decap durability, excellent text quality of formed images, reduced rear surface penetration resistance, and reduced curling characteristic of printed recording materials, and an ink-jet recording method using the same.

DESCRIPTION OF THE PREFERRED EMBODIMENTS

Figure 1:
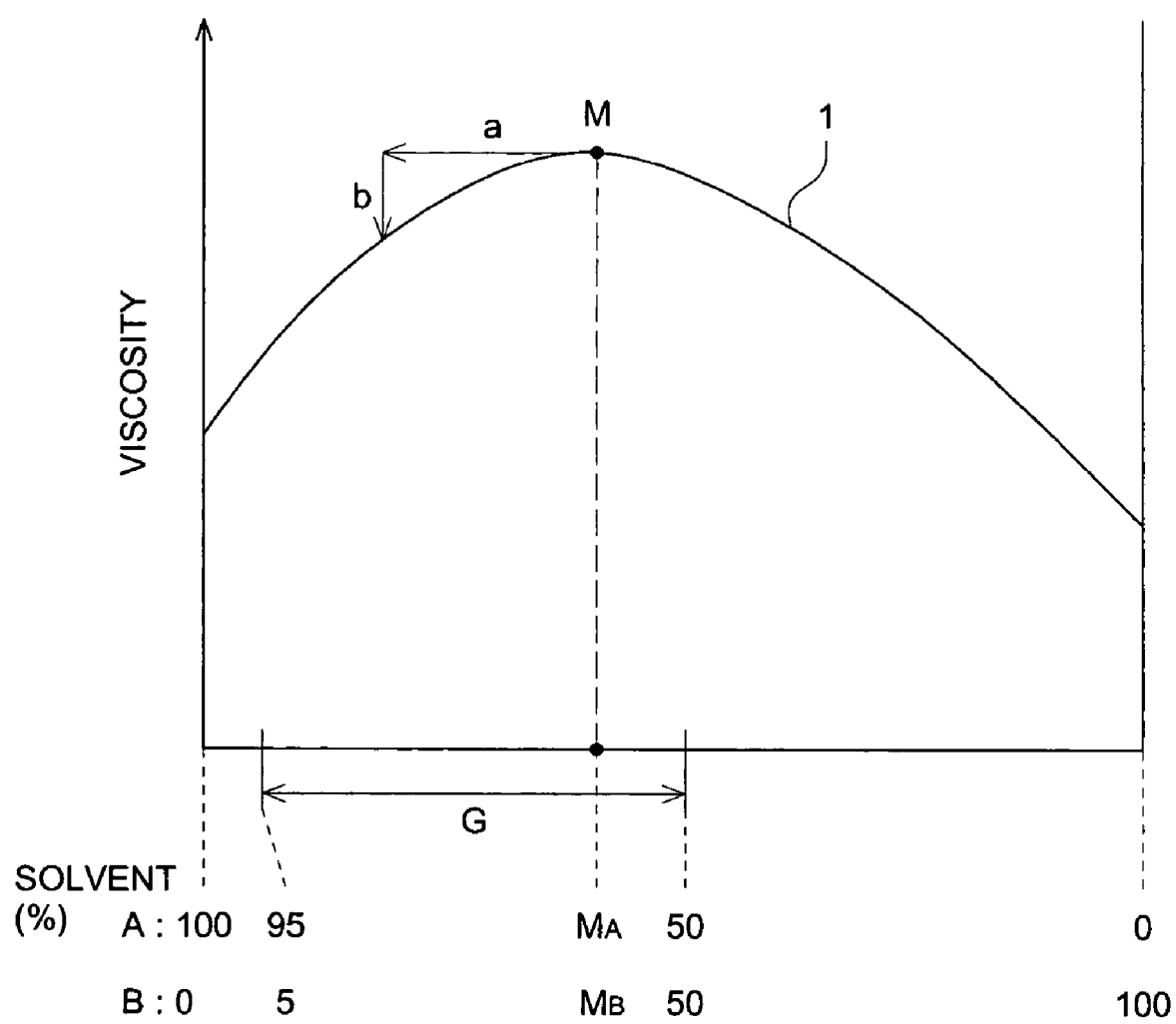
FIG. 1 is a schematic diagram showing the change of viscosity in accordance with the change of the ratio of solvent A to solvent B.

The preferred embodiments of the present invention have the following structures.
(1) An ink for ink-jet recording containing:
  a colorant; and
  a set of solvent A and solvent B, provided that solvent B has a larger vapor pressure than solvent A,
  wherein the set of solvent A and solvent B has a maximum in viscosity by changing a mixing ratio of solvent A to solvent B; and a weight of solvent $A(A_{(wt)})$ and a weight of solvent $B(B_{(wt)})$ in the ink satisfy the following relationship:

$$50 \leq [A_{(wt)}/(A_{(wt)}+B_{(wt)})] \times 100 \leq 95.$$

(2) The ink for ink-jet recording of the above-mentioned item 1,
  wherein solvent B is water.
(3) The ink for ink-jet recording of the above-mentioned item 1 or item 2,
  wherein solvent A has a vapor pressure of not more than 133 Pa measured at 25° C.
(4) The ink for ink-jet recording of any one of the above-mentioned items 1 to 3,
  wherein the weight of solvent A $(A_{(wt)})$ and the weight of solvent $B(B_{(wt)})$ in the ink satisfy the following relationship:

$$10 \leq [B_{(wt)}/(A_{(wt)}+B_{(wt)})] \times 100 \leq 50.$$

(5) The ink for ink-jet recording of any one of the above-mentioned items 1 to 4,
  wherein the colorant is a pigment.
(6) A method for ink-jet recording comprising the step of:
  jetting the ink of any one of the above-mentioned claims 1 to 5 from a plurality of nozzles of an ink-jet head of an ink-jet printer onto a recording material,
  wherein each of the nozzles has a diameter of not more than 30 μm; and the ink-jet head is a piezo type head.
(7) A method for ink-jet recording comprising the step of:
  jetting the ink of any one of the above-mentioned claims 1 to 5 from a plurality of nozzles of an ink-jet head of an ink-jet printer onto a recording material, wherein each of the nozzles has a diameter of not more than 30 μm; and the ink-jet head is a line head of a piezo type.

(8) A method for ink-jet recording comprising the step of:
jetting the ink of any one of the above-mentioned claims 1 to 5 from a plurality of nozzles of an ink-jet head of an ink-jet printer onto a recording material,
wherein each of the nozzles has a diameter of not more than 30 μm; the ink-jet head is a line head of a piezo type; and a recording speed is not less than 20 ppm.

(9) A method for ink-jet recording of any one of the above-mentioned items 6 to 8,
wherein the recording material is a paper.

The present invention will be further detailed below.

When solvents are mixed to constitute a solvent set, by forming an ink-jet ink containing a solvent set consisting of Solvent A which exhibits the maximum point of the viscosity depending on the resultant mixing ratio, and Solvent B which exhibits a larger vapor pressure than the aforesaid Solvent A, and thereby a solvent set is constituted to be in the region where the ratio of Solvent A is higher than the aforesaid maximum section, and the content ratio {[Solvent A/(Solvent B+Solvent A)×100]} of aforesaid Solvent A is 50–95 percent by weight.

It was discovered that it was possible to realize an ink-jet ink which exhibited excellent ejection stability in an ink-jet printer, for example, minimized lack of nozzles and deviated ejection of ink droplets, exhibits excellent decap resistance, excellent text quality on recording materials, reduced rear surface penetration, and reduced curling characteristic due to liquid ink on the printed recording material, whereby the present invention was achieved.

The maximum value of viscosity in the solvent set, as described in the present invention, will now be described. Initially determined is the viscosity of each of the solutions prepared by mixing Solvent A with Solvent B in an optional ratio at an extreme of 100 percent Solvent A or 100 percept Solvent B. Subsequently, as shown in FIG. 1, a graph, which shows the relationship of the viscosity versus the solvent ratio in a solvent mixture, is prepared by plotting the solvent ratio as the abscissa and the resulting viscosity as the ordinate. In most cases, the viscosity versus the solvent ratio monotonously increases or decreases as the ratio varies. As shown by 1 in FIG. 1, combinations of solvents of the present invention are specific and are characterized in that the above relationship results in a maximum point.

The ink-jet ink of the present invention is constituted in the region in which the content ratio of Solvent A is greater than the ratio in-which the mixing ratio MA (in percent) of Solvent A and MB (in percent) of Solvent B results in maximum value M in FIG. 1. Further, it is characterized that the ratio of Solvent A is 50–95 percent by weight (the ratio range shown by region G in FIG. 1).

Further, it is characterized that the relationship of vapor pressure of Solvent A and Solvent B is Solvent A>Solvent B.

Decap of ink jet heads is assumed as phenomena in which during idling, viscosity increases due to evaporation of component solvents in the ink, whereby the ejection rate of ink droplets decreases or no ejection occurs.

In the present invention, by achieving the solvent constitution, as described above, as Solvent B of a higher vapor pressure evaporates (arrow a), the viscosity of the solvent mixture decreases (arrow b). Based on this effect, since it is possible to minimize or eliminate an increase in ink viscosity due to evaporation, it is possible to retard the generation of decap. In more detail, as some of ink evaporates, viscosity tends to increase due to an increase in concentration of solutes. However, in the solvent constitution of the present invention, a decrease in viscosity of solvents minimizes the resulting viscosity variation, whereby it is possible to minimize or eliminate an increase in viscosity (including a decrease in viscosity).

Further, specifically, when printing is performed on highly absorptive recording materials such as plain paper, ink does not penetrate up to the rear surface, realizing in desired rear penetration resistance. At the same time, it is possible to realize image formation in such a manner that curling characteristic of recording materials, on which images are formed, is not adversely affected.

In the ink of the present invention, a solvent set is used which is composed of at least Solvent A and Solvent B, provided that Solvent B has a larger vapor pressure than Solvent A.

Solvent A, according to the present invention, is not particularly limited as long as the vapor pressure is less than Solvent B, which is employed in combination with Solvent A. The vapor pressure of solvents is preferably at most 133 Pa at 25° C., and is more preferably 0.01–67 Pa. Further, as physical liquid properties of Solvent A, its surface tension is preferably 25–40 mN/m at 25° C., but is more preferably 25–32 mN/m. Further, the viscosity of Solvent A is preferably 1–50 mPa·s, but is more preferably 1–30 mPa·s.

Specific examples of Solvent A, according to the present invention, include ethylene glycol monoalkyl ethers (e.g., ethylene glycol monomethyl ether, ethylene glycol monoethyl ether, and ethylene glycol monobutyl ether); diethylene glycol monoalkyl ethers (e.g., diethylene glycol monomethyl ether, diethylene glycol monoethyl ether, and diethylene glycol monobutyl ether; triethylene glycol monoalkyl ethers (e.g., triethylene glycol monomethyl ether, triethylene glycol monoethyl ether, and triethylene glycol monobutyl ether); propylene glycol monoalkyl ethers (e.g., propylene glycol monomethyl ether, propylene glycol monoethyl ether, and propylene glycol monobutyl ether); dipropylene glycol monoalkyl ethers (e.g., dipropylene glycol monomethyl ether, dipropylene glycol monoethyl ether, and dipropylene glycol monobutyl ether); tripropylene glycol monoalkyl ethers (e.g., tripropylene glycol monomethyl ether, tripropylene glycol monoethyl ether; and tripropylene glycol monobutyl ether. Of these, preferred are dialkylene glycol monoalkyl ethers or trialkylene glycol monoalkyl ethers.

It is characterized that above Solvent A is incorporated in the total of Solvents A with B commonly in an amount of 50–90 percent by weight but preferably 60–90 percent by weight.

Solvents B are not particularly limited as long as their vapor pressure is higher than that of Solvent A. Listed as Solvents B, which are preferably usable in the ink of the present invention, may, for example, be water, methanol, ethanol, 1-propanol, 2-propanol, and ethylene glycol. In view of more efficiently exhibiting targeted effects of the present invention, water is preferred.

In the ink of the present invention, the content ratio of Solvent B is preferably 10–50 percent by weight with respect to the total solvent with (Solvent A+Solvent B).

In the present invention, it is possible to obtain the viscosity as well as the vapor pressure of each of the individual solvent and mixtures thereof by referring to data of each described, for example, in "Shinpan Solvent Pocket Book (New Edition Solvent Pocket Book)" edited by Yuki Gosei Kagaku Kyokai, Omu Sha (1994), or by employing prior art methods.

Other than each of the solvents according to the present invention, various types of functional additives are incorporated in the ink of the present invention.

The aforesaid solvents in the ink of the present invention contain, if desired, colorants as well as various additives described below. Preferably employed as colorants used in the present invention are, for example, yellow, magenta, cyan, black, blue, green or red colorants. Of these, yellow, magenta, cyan, and black colorants are particularly favored.

It is possible to apply the ink of the present invention to various types of ink-jet inks such as a dye ink which employs dyes as a colorant, a pigment ink in which colorants are insoluble in the solvents constituting the ink-jet ink, and a dispersion system containing minute pigment particles is formed, or a dispersion ink which is composed of a dispersion of polymers colored with colorants.

Listed as dyes usable in the present invention may be azo dyes, methine dyes, azomethine dyes, xanthene dyes, quinone dyes, phthalocyanine dyes, triphenylmethane dyes, and diphenylmethane dyes. Listed as specific compounds may, for example, be dyes exemplified in JA-A No. 2002-264490.

Further, selected as oil-soluble dyes, which form minute colored particles together with the aforesaid polymers to become colorants, are dyes such as disperse dyes which are soluble in organic solvents having no water-soluble group such as carboxylic acid or sulfonic acid and which are insoluble in water. Further, included are dyes which are prepared in such a manner that water-soluble dyes are modified to become oil-soluble ones through formation of salts with long chain bases. For example, known are dyes such as acid dyes, direct dyes, or reactive dyes which form salts with long chain amines.

However, in the ink of the present invention, it is preferred that pigments are employed as a colorant. For resulting in sufficient exhibition of the targeted effects, pigments which are insoluble in the aforesaid solvent system are preferred.

Employed as pigments usable in the present invention may be those known in the prior art without any limitation. It is possible to use either water-dispersible dyes or oil-dispersible dyes. It is also possible to preferably use, for example, organic pigments such as insoluble pigments or lake pigments, as well as inorganic pigments such as carbon black.

Examples of preferred insoluble pigments include, but not particularly limited to, azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

Listed as specific pigments which are preferably usable are those below.

Examples of pigments for magenta or red include: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of pigments for orange or yellow are, include: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94, and C.I. Pigment Yellow 138.

Examples of pigments for green or cyan include: C.I. Pigment Blue 15, C.I. Pigment Blue 15:2, C.I. Pigment Blue 15:3, C.I. Pigment Blue 16, C.I. Pigment Blue 60, and C.I. Pigment Green 7.

In addition to the above, when intermediate colors are required, it is preferable that the following pigments are employed singly or in combination. Examples of employed pigments include:

C.I. Pigment Red 177, 194, 209, and 224,
C.I. Pigment Orange 43
C.I. Vat Violet 3
C.I. Pigment Violet 19, 23, and 37
C.I. Pigment Green 7 and 36
C.I. Pigment Blue 15:6

Further examples of pigments for black are include: C.I. Pigment Black 1, C.I. Pigment Black 6, and C.I. Pigment Black 7.

It is preferable that pigments employed in the present invention are dispersed together with dispersing agents and necessary additives to achieve various desired purposes, employing a homogenizer and then employed, such as those known in the art, including a ball mill, a sand mill, or a high pressure homogenizer.

The average particle diameter in the pigment dispersion employed in the ink of the present invention is preferably 10–200 nm, is more preferably 10–100 nm, but is still more preferably 10–50 nm. When the average particle diameter in the pigment dispersion exceeds 100 nm, the resulting dispersion becomes unstable, while when it is less than 10 nm, stability of the pigment dispersion is degraded, whereby storage stability of the ink tends to become deteriorated.

It is possible to determine the particle diameter of a pigment dispersion employing commercially available diameter measurement devices using a light scattering method, an electrophoretic method, or a laser Doppler method. Further, at least 100 particle images are captured employing a transmission type electron microscope, whereby it is possible to determine the particle diameter in such a manner that the resulting images are subjected to statistical processing employing image analysis software such as Image-Pro (produced by Media Cybernetics).

In the ink-jet ink of the present invention, employed as additives during dispersion may be surface active agents. Employed as surface active agents usable in the present invention may be any of cationic, anionic, amphoteric, or nonionic surface active agents.

Listed as cationic surface active agents are aliphatic amine salts, aliphatic quaternary ammonium salts, benzalconium salts, benzetonium chloride, pyridinium salts, and imidazolinium salts.

Listed as anionic surface active agents are fatty acid soap, N-acyl-N-methylglycine salts, N-acyl-N-methyl-β-alanine salts, N-acylglutamic acid salts, acylated peptides, alkylsulfonic acid salts, alkylbenzenesulfonic acid salts, alkylnaphthalenesulfonic acids, dialkylsulfosuccinic acid ester salts, alkylsulfoacetic acid salts, α-olefinsulfonic acid salts, N-acylmethyltaurine, sulfonated oil, higher alcohol sulfuric acid ester salts, secondary higher alcohol sulfuric acid ester salts, alkyl ether sulfuric acid salts, secondary higher alcohol ethoxysulfates, polyoxyethylene alkyl phenyl ether sulfuric acid salts, monoglysulfates, fatty acid alkylolamide sulfuric acid ester salts, alkyl ether phosphoric acid ester salts, and alkylphosphoric acid ester salts.

Listed as amphoteric surface active agents are carboxybetaine type, sulfobetaine type, aminocarboxylic acid salts, and imidazoliniumbetaine.

Listed as nonionic surface active agents are polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid ester, polyoxyethylene sunflower flower oil, hardened sunflower oil, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol, and acetylene alcohol.

Further, in order to accelerate penetration of ink droplets after ink ejection into plain paper, it is preferable to use surface active agents. The above surface active agents are not limited as long as they do not adversely affect storage stability of inks. Employed as such surface active agents may be the same ones which are used as an additive during the aforesaid dispersion.

Further, the total content of calcium ions, magnesium ions, and iron ions, all of which are multivalent metal ions in the ink of the present invention, is preferably at most 10 ppm, is more preferably 0.1–5 ppm, but is most preferably 0.1–1 ppm.

By controlling the content of multivalent metal ions in an ink-jet ink within the above specified range, it is possible to obtain inks exhibiting high dispersion stability. Multivalent metal ions related to the present invention are incorporated in the form of sulfates, chlorides, nitrates, acetates, organic ammonium salts, and EDTA salts.

In the ink of the present invention, in response to purposes to enhance ejection stability, adaptability to printing heads and ink cartridges, storage stability, and image retention properties, if desired, other than those described above, it is possible to appropriately select and employ various types of prior art additives such as polysaccharides, viscosity modifiers, specific resistance controlling agent, film forming agents, UV absorbers, antioxidants, anti-discoloring agents, antiseptic agents, or anti-rusting agents. Examples include minute oil droplets of liquid paraffin, dioctyl phthalate, tricresyl phosphate, or silicone oil, UV absorbers described in JP-A Nos. 57-74193, 57-87988, and 62-261476, anti-discoloring agents described in JP-A Nos. 57-74192, 57-87989, 60-72785, 61-146591, 1-95001, and 3-13376, as well as optical brightening agents described in JP-A Nos. 59-42993, 59-52689, 62-280069, 61-242871, and 4-219266.

The surface tension of the ink of the present invention, which is constituted, as above, is preferably 25–40 mN/m at 25° C., is more preferably 25–35 mN/cm, but is still more preferably 30–35 mN/cm. Further, ink viscosity is preferably 1–40 mPa·s, at 25° C., is more preferably 5–40 mPa·s, but is still more preferably 5–15 mPa·s. Still further, oxygen concentration dissolved in the ink of the present invention is preferably a maximum of 2 ppm at 25° C. By satisfying the above conditions for the dissolved oxygen concentration, it is possible to minimize formation of air bubbles, whereby it is possible to realize an ink-jet recording method which results in excellent ejection stability even during high speed printing. It is possible to determine the amount of oxygen dissolved in the ink employing, for example, a dissolved oxygen measurement apparatus DO-14P (produced by DKK-TOA Corp.).

In the image forming method employing the ink-jet ink of the present invention, ink-jet prints are obtained in such a manner that ink droplets are ejected from the ink-jet heads based on digital signals, employing an ink-jet printer loaded with ink-jet ink.

During image formation by ejecting the ink of the present invention, employed ink-jet heads may use either an on-demand system or a continuous system. Further, employed as an ejection system may be any of the electric-mechanical conversion system (e.g., a single-cavity type, a double-cavity type, a bender type, a piston type, a share mode type, or a shared wall type), or an electric-thermal conversion system (e.g., a thermal ink-jet type,.or a Bubble Jet (registered trade name) type.

In these methods, the ink-jet recording method of the present invention is characterized in that recording is performed on recording materials by ejecting the ink of the present invention from piezo type ink-jet recording heads at a maximum nozzle diameter of 30 μm, further, recording is performed on recording materials by ejecting the ink of the present invention from piezo type ink-jet recording heads at a nozzle diameter of at most 30 μm of the line head system, or recording is performed on recording materials employing piezo type ink-jet recording heads at a maximum nozzle diameter of 30 μm at a printing rate of 20 ppm.

By carrying out printing, employing recording heads of the line head system as an ink-jet printer system instead of using the recording heads of the shuttle head system, it is possible to fully utilize the printing characteristics of the ink of the present invention. As a result, it is possible to achieve the most desirous dot shape (circularity) during the deposition of ink droplets on recording materials, as well as desired printing accuracy.

Further, the ink of the present invention exhibits excellent characteristics in terms of ejection stability and decap resistance, as well as high rate printing. Subsequently, it is preferable to achieve printing at a high rate of at least 20 ppm. The printing rate is more preferably 20–100 ppm but is still more preferably 25–50 ppm. The term "ppm", as described in the present invention, refers to pages per minute, namely the number of printed A4 size sheets, employed as a recording material, per minute.

Recording materials usable in the ink-jet recording method of the present invention are not limited, as long as printing ink is absorbed and held as desired. For example, it is possible to use specialized ink-jet recording materials containing a non-absorptive or absorptive support having thereon an ink absorptive layer which absorbs and holds ink, as well as paper supports such as coated paper or non-coated paper. However, in the ink-jet recording method of the present invention, in view of resulting in desired rear surface penetration resistant effects as well as resulting in high quality text images, it is preferable to perform image printing employing plain paper as the recording material.

Plain paper employed in the ink-jet recording method of the present invention is not particularly limited, but non-coated paper, special printing sheet paper, and 80–200 μm thick non-coated paper belonging to a part of information sheet paper are preferred. Such plain paper according to the present invention is composed of chemical pulp represented by LBKP and NBKP, sizing agents, and fillers as major components, as well as, if desired, paper making aids, and is made employing conventional methods. Simultaneously employed as pulp materials used to make the plain paper according to the present invention may be mechanical pulp and recycled waste paper pulp. Further, these may be employed as main components without any problem.

Listed as internally added sizing agents are, for example, rosin size, AKD, al-nickel succinic anhydride, epichlorohydrin, cationic starch, and acrylamide.

Further listed as fillers which are internally added to the plain paper according to the present invention are, for example, minute particle silicic acid powder, aluminum silicate, diatomaceous earth, kaolin, kaolinite, halloysite, nacrite, dickite, pyrophylite, sericite, titanium dioxide, and bentonite.

In view of minimizing the rear surface penetration of the ink of the present invention, and enhancing fixability of colorants, the pliant paper according to the present invention may incorporate water-soluble multivalent metal salts.

The water-soluble multivalent metal salts usable in the plain paper according to the present invention are not particularly limited. For example, added are salts of metals such as aluminum, calcium, magnesium, zinc, iron, strontium, barium, nickel, copper, scandium, gallium, indium, titanium, zirconium, tin, or lead, as well as salts such as sulfates, nitrates, formates, succinate, malonate, chloroacetate, or toluenesulfonates. Further, employed as salts of water-soluble multivalent metal ions may be water-soluble inorganic polymers such as polychlorinated aluminum. In terms of solubility in water, preferred are those which exhibit at least 0.1 percent by weight and are more preferred which exhibit at least 1 percent by weight. Of these, preferred are water-soluble salts composed of aluminum, calcium, aluminum, magnesium, or zinc, because metal ions of the resulting salts are colorless. Particularly preferred are aluminum chloride, aluminum sulfate, aluminum nitrate, aluminum acetate, calcium chloride, calcium sulfate, calcium nitrate, calcium acetate, magnesium sulfate, magnesium nitrate, magnesium acetate, zinc chloride, zinc sulfite, zinc nitrate, and zinc acetate.

EXAMPLES

The present invention will now be described with reference to examples; however, the present invention is not limited thereto.

<<Preparation of Inks>>

(Preparation of Pigment Inks 1–15)

Pigments, Solvent A, Solvent B (being water), and a pigment dispersion were blended in the combinations listed in Table 1. Thereafter, the resulting mixture was sealed in a glass bottle together with 200 g of 1 mm diameter zirconia beads and was dispersed over a period of two hours, employing a paint shaker, whereby each of the pigment dispersions was prepared. Subsequently, the zirconia beads were removed. Thereafter, the surface active agent (added to some of the inks) and antiseptic agents, listed in Table 1, were added to the resulting pigment dispersion and vigorously mixed. Subsequently, the resulting liquid composition was subjected to filtration and also to a membrane degassing treatment employing a hollow fiber membrane, whereby Pigment Inks 1–15 were prepared.

(Preparation of Dye Inks 1–3)

In the combinations listed in Table 1, a dye Solvent A, Solvent B (being water), and an antiseptic agent were blended and dissolved. Thereafter, each of the resulting solutions was subjected to filtration and a membrane degassing treatment, employing a hollow fiber membrane, whereby Dye Inks 1–3 were prepared.

The numeric values listed in Table 1 refer to part by weight.

TABLE 1

| Ink No. | Solvent A Type | Solvent A Added Amount | Solvent B: Water Added Amount | Colorant Type | Colorant Added Amount | Pigment Dispersing Agent *1 | Surface Active Agent S104 | Antiseptic Agent Proxel | Remarks |
|---|---|---|---|---|---|---|---|---|---|
| Pigment Ink 1 | DPGmME | 80 | 20 | Pigment 1 | 5.0 | 2.0 | — | 0.1 | Inv. |
| Pigment Ink 2 | DPGmME | 80 | 20 | Pigment 2 | 4.0 | 1.0 | 0.3 | 0.1 | Inv. |
| Pigment Ink 3 | DPGmME | 90 | 10 | Pigment 1 | 5.0 | 2.0 | — | 0.1 | Inv. |
| Pigment Ink 4 | DPGmME | 90 | 10 | Pigment 1 | 5.0 | 2.0 | 0.3 | 0.1 | Inv. |
| Pigment Ink 5 | TPGmME | 90 | 10 | Pigment 2 | 4.0 | 1.0 | — | 0.1 | Inv. |
| Pigment Ink 6 | TPGmME | 85 | 15 | Pigment 2 | 4.0 | 1.0 | 0.3 | 0.1 | Inv. |
| Pigment Ink 7 | TPGmME | 85 | 15 | Pigment 2 | 4.0 | 1.0 | — | 0.1 | Inv. |
| Pigment Ink 8 | TEGmBE | 90 | 10 | Pigment 2 | 4.0 | 1.0 | 0.3 | 0.1 | Inv. |
| Pigment Ink 9 | EG | 80 | 20 | Pigment 1 | 5.0 | 2.0 | 0.3 | 0.1 | Comp. |
| Pigment Ink 10 | TEG | 70 | 30 | Pigment 2 | 4.0 | 1.0 | 0.3 | 0.1 | Comp. |
| Pigment Ink 11 | 1,5-PDO | 50 | 50 | Pigment 1 | 5.0 | 2.0 | 0.3 | 0.1 | Comp. |
| Pigment Ink 12 | DPGmME | 40 | 60 | Pigment 1 | 5.0 | 2.0 | — | 0.1 | Comp. |
| Pigment Ink 13 | TPGmME | 40 | 60 | Pigment 2 | 4.0 | 1.0 | 0.3 | 0.1 | Comp. |
| Pigment Ink 14 | TPGmME | 100 | 0 | Pigment 1 | 5.0 | 2.0 | 0.3 | 0.1 | Comp. |
| Pigment Ink 15 | EG | 100 | 0 | Pigment 1 | 5.0 | 2.0 | 0.3 | 0.1 | Comp. |
| Dye Ink 1 | DPGmME | 80 | 20 | Dye 1 | 4.0 | — | — | 0.1 | Comp. |
| Dye Ink 2 | TEG | 70 | 30 | Dye 1 | 4.0 | — | 0.3 | 0.1 | Comp. |
| Dye Ink 3 | TPGmME | 40 | 60 | Dye 1 | 4.0 | — | — | 0.1 | Comp. |

Inv.: Present Invention
Comp.: Comparative Example

Each of the additives, which are abbreviated in above Table 1, is as follows:

<Solvent A>

EG: ethylene glycol

TEG: triethylene glycol 1,5-PDO: 1,5-pentanediol

DPGmME: dipropylene glycol monomethyl ether

TPGmME: tripropylene glycol monomethyl ether

TEGmBE: triethylene glycol monobutyl ether

<Colorant: pigment>

Pigment 1: C.I. Pigment Red 122

Pigment 2: C.I. Pigment Blue 15:4

<Colorant: Dye>

Dye 1: C.I. Solvent Blue 70

<Pigment Dispersing Agent>

1: copolymer at a weight average molecular weight of 12,000, prepared by copolymerizing methacrylic acid, methyl methacrylate, 2-ethylhexyl methacrylate, and hydroxythyl acrylate (at a weight ratio of 40/20/10/30)

<Surface Active Agent>
S-104: Surfinol 104 (produced by Air Products Co.)

<Antiseptic Agent>
Proxel: product of Avecia Limited
(Characteristics of Solvent A, Solvent B (water) employed for preparing each of the inks)
(Vapor Pressure and Viscosity of Individual Solvent)
EG: viscosity of 16.8 mPa·s and vapor pressure of 93 Pa
TED: viscosity of 35.7 mPa·s and vapor pressure of 23.1 kPa
1,5-PDO: viscosity of 93.5 mPa·s and vapor pressure of less than 1 Pa
DPGmME: viscosity of 3.1 mPa·s and vapor pressure of 53 Pa
TPGmME: viscosity of 5.3 mPa·s and vapor pressure of 4 Pa
TEGmBE: viscosity of 7.3 mPa·s and vapor pressure of 3 Pa
Water: viscosity of 0.87 mPa·s and vapor pressure of 3.16 Pa
Each of the above characteristic values is at 25° C.

(Viscosity Characteristics of Mixed Solvent of Solvent A with Water)

A solvent set was prepared in which the mixing ratio of Solvent A to water was varied from 100:0–0:100 at intervals of 10 percent by weight. Subsequently, the viscosity of each of the mixed solvents was determined.

Solvent Set of EG/water: In the course of varying the mixing ratio, no maximum value of viscosity was noted, and the viscosity of 100 percent EG was the maximum value (16.8 mPa·s).

Solvent Set of TEG/water: In the course of varying the mixing ratio, no maximum value of viscosity was noted, and the viscosity of 100 percent TEG was the maximum value (35.7 mPa·s).

Solvent Set of 1,5-PDO/water: Ion the course of varying the mixing ratio, no maximum value of viscosity was noted, and the viscosity of 100 percent 1,5-PDO was the maximum value (93.5. mPa·s).

Solvent Set of DPGmME/water: Under a mixing condition at which DPGmME: water was 70:30, the maximum viscosity (of 6.4 mPa·s) resulted.

Solvent Set of TPGmME/water: Under a mixing condition at which TPGmME: water was 80:20, the maximum viscosity (of 10.1 mPa·s) resulted.

Solvent Set of TEGmBE/water: Under a mixing condition at which TEGmBE: water was 80:20, the maximum viscosity (of 9.7 mPa·s) resulted.

Example 1

<<Ink-jet Image Recording>>

By employing a share mode piezo type recording head of a nozzle aperture diameter of 32 μm, a volume of ejected ink droplets of 20 pl, and 256 nozzles, as well as employing each of Pigment Inks 1, 3, 9, and 12 prepared as above, ejection was performed under each of the conditions below, and decap resistance and intermittent ejection adaptability were evaluated.

(Evaluation of Decap Resistance)

At an ambience of 23° C. and 20 percent relative humidity, a share mode piezo type recording head of 256 nozzles was employed, and voltage applied to the recording head was controlled so that the rate of ink droplets reached 8 m/second during an ejection interval of 50 milliseconds as the initial state. Subsequently, the ejection interval was varied and the relative ratio of the liquid droplet rates was determined based on the formula below, whereby decap resistance was evaluated based on the criteria below.

For example, 100 ink droplets were ejected at an ejection interval of 50 microseconds, and 100 ink droplets were also ejected t second after the initial ejection at an ejection interval of 50 microseconds. Subsequently, the rate of the initial ink droplet after interval time t was determined and the resulting value was designated as the ink droplet rate after interval time t.

The relative ratio of ink droplet rate (in percent)=(rate of ink droplet after interval time t)/(rate of ink droplet at an ejection interval of 50 milliseconds)

A: interval time t was at least 10 seconds during which relative ratio of ink droplet rate became at most 70 percent B: interval time t was 1–10 seconds during which relative ratio of ink droplet rate became at most 70 percent C: interval time t was 0.3–1 seconds during which relative ratio of ink droplet rate became at most 70 percent D: interval time t was less than 0.3 second during which Relative ratio of ink droplet rate became at most 70 percent E: at 3-second intermittent ejection, ink droplets were not ejected (Evaluation of Intermittent Ejection Adaptability)

At an ambience of 23° C. and 20 percent relative humidity, each of Pigment Inks 1, 3, 9, and 12, prepared as above, was loaded in a recording head and was allowed to stand for 8 hours. Subsequently, under the same conditions, the ink was ejected. The deposition state of ink droplets was observed, and intermittent ejection adaptability was evaluated based on the criteria below.

A: after being allowed to stand, when ejection was conducted without any treatment, all 256 nozzles achieved ejection B: after being allowed to stand, when ejection was conducted without any treatment, 1–5 nozzles resulted in deviated ejection, but ejection returned to normal after one wiping operation of the recording head C: after being allowed to stand, when ejection was conducted without any treatment, 1–5 nozzles resulted in deviated ejection, but ejection returned to normal by one suction and wiping operation of the recording head D: after being allowed to stand, when ejection was conducted without any treatment, at least 6 nozzles resulted in deviated ejection, but ejection returned to normal by two suction and wiping operations of the recording head E: After being allowed to stand, when ejection was conducted without any treatment, at least 6 nozzles resulted in deviated ejection, and further it was not possible to return the ejection to normal even after two suction and wiping operations of the recording head Table 2 below shows these results.

TABLE 2

| Ink No. | Decap Resistance | Intermittent Ejection Adaptability | Remarks |
|---|---|---|---|
| Pigment Ink 1 | A | B | Inv. |
| Pigment Ink 3 | A | A | Inv. |
| Pigment Ink 9 | C | C | Comp. |
| Pigment Ink 12 | D | D | Comp. |

Inv.: Present Invention
Comp.: Comparative Example

As can clearly be seen from the results in Table 2, the inks of the present invention, containing the ink set which exhibited the viscosity maximum at the mixing ratio specified by the present invention and were composed of the specified mixing ratio, exhibited excellent decap resistance as well as intermittent ejection adaptability of the recording head, compared to the comparative inks.

Example 2

Decap resistance and Intermittent Ejection Adaptability 1 were evaluated in the same manner employing the methods described in Example 1, except that Pigment Inks 2, 5, 6, and 10 were used, and a share mode piezo type recording head of a nozzle aperture of 25 μm, an ejected ink droplet volume of 4 pl, and 256 nozzles was employed. Table 3 below shows these results.

TABLE 3

| Ink No. | Decap Resistance | Intermittent Ejection Adaptability | Remarks |
| --- | --- | --- | --- |
| Pigment Ink2 | A | B | Inv. |
| Pigment Ink5 | A | A | Inv. |
| Pigment Ink6 | A | A | Inv. |
| Pigment Ink 10 | E | E | Comp. |
| Pigment Ink 13 | D | E | Comp. |

Inv.: Present Invention
Comp.: Comparative Example

As can clearly be seen from the results of Table 3, even under minute ink droplet conditions in which the diameter of the nozzle aperture was 25 μm and the ejected ink volume was 4 pl, the inks of the present invention, which exhibited the viscosity maximum portion depending on the mixing ratio specified by the present invention and contained the ink set at the specified mixing ratio, exhibited excellent decap resistance as well as excellent Intermittent Ejection Adaptability 1, compared to the comparative examples.

Example 3

An line head system ink-jet printer of a nozzle resolution per color of 1,440 dpi (dpi, as described in the present invention, represents the number of dots per 2.54 cm) and a total number of 2,560 nozzles was employed in which 10 share mode piezo type recording heads (each at a nozzle aperture of 25 μm, an ejected ink volume of 4 pl, and 256 nozzles), described in Example 1, were arranged in a line across the width direction. To the above ink-jet printer, each of Pigment Ink 1, 3, 9, 12 was loaded, and driving voltage was controlled to reach an 8 m/second ink droplet rate and a 4 pl ink droplet volume.

Subsequently, employed, as a recording material, A4 plain business class paper produced by Konica Minolta Corp., continuous printing was performed at a rate of 10 ppm, while the short edge of the A size paper was directed to the conveying direction. During the above operation, the interval between sheets of plain paper was set at 10 mm and the following images were printed, whereby Images 1–4 were produced.

Incidentally, the above printing rate (being the conveying rate of plain paper) 100 ppm refers to the rate of printing 10 sheets of A4 size plain paper per minute, namely 2,200 mm/minute.

<<Evaluation of Intermittent Printing Adaptability>>

At an ambience of 23° C. and 30 percent relative humidity, employing the above ink-jet printer, a 40 by 45 mm solid image was continuously printed onto A4 size plain paper at a resolution, in the major scanning direction, of 1,440 dpi. During this printing, a pattern was repeated in which 283 ink droplets were continuously ejected (for approximately 0.27 second), ejection was terminated over a period of approximately 5.73 seconds, and subsequently 283 ink droplets were ejected. In such a manner, 50 sheets of plain paper were continuously printed. Subsequently, the final 50th print was visually observed, and intermittent printing adaptability was evaluated based on the criteria below.

A: no visual image mottling was noted, and no lack in the outline portion was noted, resulting in a good image
B: very slight uneven density which did not result in streaking was noted, but no generation of lack in the outline portion was noted
C: the outline of the image of the front portion in the conveying direction was not aligned
D: only one white streak was noted
E: two white streaks were generated <<Evaluation of Character Quality>>

Employing the above method, the following Chinese characters were printed: "口, 四, 日, 回, 因, 田, 国, 圖, 日, 図, and 圏"
at a recording resolution of 1,440×1,440 dpi, employing in an MS Ming font of a size of 4-point, 5-point, and 6-point. The printed character images were visually observed and character quality was evaluated based on the criteria below.

A: all 4-point characters were clearly recorded in detail
B: it was easy to read 4-point characters
C: it was difficult to read 4-point characters, but it was possible to read 5-point characters
D: it was difficult to read 4-point and 5-point characters, but it was possible to read 6-point characters
E: it was difficult to read 6-point characters <<Evaluation of Reduced Curling Characteristic After Printing>>

At an ambience of 23° C. and 30 percent relative humidity, employing the above ink-jet printer, a 200×280 mm solid image was printed onto A4 size plain paper at a resolution of 1,440×1,440 dpi. Subsequently, at an ambience of 23° C. and 20 percent relative humility, the printed plain paper was allowed to stand on a flat stand over a period of one week so that the printed surface faced up. Subsequently, the elevation of each of the four corners was measured, and reduced curling characteristic was evaluated based on the criteria below.

A: almost true flatness was noted and elevation of any of the corners was less than 5 mm
B: the largest elevation of any of the corners was 5–10 mm
C: the largest elevation of any of the corners was 10–20 mm
D: the largest elevation of any of the corners was 20–50 mm
E: the largest elevation of any of the corners was at least 50 mm or it was not possible to determine elevation due to formation of a cylindrical roll Table 4 shows these results.

TABLE 4

| Image No. | Ink No. | Intermittent Printing Adaptability | Character Quality | Curl | Remarks |
| --- | --- | --- | --- | --- | --- |
| 1 | Pigment Ink 1 | A | B | A | Inv. |
| 2 | Pigment Ink 3 | A | A | A | Inv. |

TABLE 4-continued

| Image No. | Ink No. | Intermittent Printing Adaptability | Character Quality | Curl | Remarks |
|---|---|---|---|---|---|
| 3 | Pigment Ink 9 | D | D | E | Comp. |
| 4 | Pigment Ink 12 | E | D | C | Comp. |

Inv.: Present Invention
Comp.: Comparative Example

As can clearly be seen from the results of Table 4, images, which were formed employing the inks of the present invention, which exhibited the viscosity maximum portion depending on the mixing ratio specified by the present invention and contained the ink set at the specified mixing ratio, exhibited excellent decap resistance, excellent intermittent ejection adaptability, and reduced curling characteristic, compared to the comparative examples.

Example 4

<<Image Printing>>

Images 5–18 were prepared under the same image printing conditions described in Example 3, except that the printing rate (the conveying rate of plain paper) was changed to 200 ppm and each of the inks described in Table 5 was employed.

<<Evaluation of Printed Images>>

Each of the images, prepared as above, was evaluated for intermittent printing adaptability, text quality, and curling characteristic based on the methods described in Example 3, as well as ejection deviation and rear penetration after printing based on the methods below. Table 5 shows these results.

(Evaluation of Line Deviation Resistance)

By employing the ink-jet printer described in Example 3, 50 checked patterns (a width of one dot, and a length of 10×10 cm) were printed on plain paper. The recorded checked line pattern was visually observed and line deviation resistance was evaluated based on the criteria below.
A: neither line deviation nor line lack was noted
B: line deviation occurred at one position
C: line deviation occurred at two or three positions
D: line deviation occurred at 4–10 positions or line lack occurred at one position
E: line deviation occurred at 11 or more positions or line lack occurred at one or more positions (Evaluation of Transfer Resistance)

At an ambience of 23° C. and 80 percent relative humidity, by employing the above ink-jet printer, a 40 mm×40 mm solid images were continuously printed at a resolution of 1,440 dpi×1,440 dpi on 100 A4 size sheets of plain paper. During this printing, each sheet was stacked approximately 4 seconds including the conveyance time after printing so that the surface of printed sheet faced the rear surface of the subsequently printed sheet, and the 100 sheets were stacked. Subsequently, each of the image layer printing and the rear surface which had been stacked were visually observed and transfer resistance was evaluated based on the criteria below.
A: no transfer from the image to the rear surface was noted on 99 sheets
B: slight transfer was noted in the range of 1–10 sheets, but quality was commercially viable
C: image transfer was noted on the rear surface of almost all sheets, resulting in problems for commercial viability

TABLE 5

| Image No. | Ink No. | Intermittent Printing Adaptability | Line Deviation Resistance | Curl | Character Quality | Transfer Resistance | Remarks |
|---|---|---|---|---|---|---|---|
| 5 | Pigment 2 | A | A | A | A | A | Inv. |
| 6 | Pigment 4 | A | A | A | A | A | Inv. |
| 7 | Pigment 5 | A | A | A | A | A | Inv. |
| 8 | Pigment 6 | A | A | A | A | A | Inv. |
| 9 | Pigment 7 | A | A | A | A | A | Inv. |
| 10 | Pigment 8 | A | B | C | A | B | Inv. |
| 11 | Pigment 10 | E | D | E | B | C | Comp. |
| 12 | Pigment 11 | E | D | E | B | C | Comp. |
| 13 | Pigment 13 | D | D | E | C | C | Comp. |
| 14 | Pigment 14 | A | A | A | D | A | Comp. |
| 15 | Pigment 15 | A | A | E | D | C | Comp. |
| 16 | Dye Ink 1 | A | A | B | B | B | Comp. |
| 17 | Dye Ink 2 | E | D | E | C | C | Comp. |
| 18 | Dye Ink 3 | D | D | C | C | C | Comp. |

Inv.: Present Invention
Comp.: Comparative Example

As can clearly be seen from the results of Table 5, images, which were formed employing the inks of the present invention, which exhibited the viscosity maximum portion depending on the mixing ratio specified by the present invention, and contained the ink set at the specified mixing ratio, exhibited excellent intermittent printing adaptability, and excellent character quality, reduced curling characteristic, as well as, in addition, exhibited reduced line deviation during injection and excellent transfer resistance, compared to the comparative examples.

What is claimed is:
1. An ink for ink-jet recording comprising:
a colorant; and
a set of solvent A and solvent B, provided that solvent B is water and has a larger vapor pressure than solvent A, wherein the set of solvent A and solvent B has a maximum in viscosity by changing a mixing ratio of solvent A to solvent B; and a weight of solvent A ($A_{(wt)}$) and a weight of solvent B ($B_{(wt)}$) in the ink satisfy the following relationship:

$$10 \leq [B_{(wt)}/(A_{(wt)}+B_{(wt)})] \times 100 \leq 50.$$

2. The ink for ink-jet recording of claim 1, wherein solvent A has a vapor pressure of not more than 133 Pa measured at 25° C.

3. The ink for ink-jet recording of claim 1, wherein the colorant is a pigment.

4. A method for ink-jet recording comprising the step of:
jetting the ink of claim 1 from a plurality of nozzles of an ink-jet head of an ink-jet printer onto a recording material,
wherein each of the nozzles has a diameter of not more than 30 μm; and the ink-jet head is a piezo type head.

5. A method for ink-jet recording comprising the step of:
jetting the ink of claim 1 from a plurality of nozzles of an ink-jet head of an ink-jet printer onto a recording material,
wherein each of the nozzles has a diameter of not more than 30 μm; and the ink-jet head is a line head of a piezo type.

6. A method for ink-jet recording comprising the step of:
jetting the ink of claim 1 from a plurality of nozzles of an ink-jet head of an ink-jet printer onto a recording material,
wherein each of the nozzles has a diameter of not more than 30 μm; the ink-jet head is a line head of a piezo type; and a recording speed is not less than 20 ppm.

7. A method for ink-jet recording comprising the step of:
jetting the ink of claim 1 from a plurality of nozzles of an ink-jet head of an ink-jet printer onto a recording material,
wherein each of the nozzles has a diameter of not more than 30 μm; and the recording material is a paper.

\* \* \* \* \*